United States Patent [19]

Kahl

[11] 4,381,763

[45] May 3, 1983

[54] LOW COST, LOW PRESSURE, SOLAR HEATED FENCE SURROUNDING A SWIMMING POOL

[76] Inventor: Karl H. Kahl, 8 Brian Rd., Chelmsford, Mass. 01824

[21] Appl. No.: 286,773

[22] Filed: Jul. 27, 1981

Related U.S. Application Data

[63] Continuation-in-part of Ser. No. 116,295, Jan. 28, 1980, abandoned, which is a continuation of Ser. No. 894,401, Apr. 7, 1978, abandoned.

[51] Int. Cl.³ .............................................. F24J 3/02
[52] U.S. Cl. ..................................... 126/416; 126/437; 126/444; 126/449; 4/493
[58] Field of Search ............... 126/416, 419, 415, 437, 126/400, 444, 448; 4/493; 137/494; 165/49; 52/168; 256/1, 23, 73, 24, 31

[56] References Cited

U.S. PATENT DOCUMENTS

| | | | |
|---|---|---|---|
| 3,146,774 | 9/1964 | Yellott | 126/271 |
| 3,277,884 | 10/1966 | Rowekamp | 126/444 |
| 3,868,945 | 3/1975 | Konopka et al. | 126/416 |
| 3,933,311 | 1/1976 | Lemelson | 256/24 X |
| 3,991,742 | 11/1976 | Gerber | 126/416 X |
| 4,056,090 | 11/1977 | Henriques et al. | 126/444 |
| 4,187,901 | 2/1980 | Coleman et al. | 126/416 X |
| 4,203,421 | 5/1980 | Benuc | 126/444 |
| 4,211,213 | 7/1980 | Nissen et al. | 126/416 |
| 4,261,332 | 4/1981 | Stewart | 126/416 |
| 4,280,477 | 7/1981 | Divine | 126/416 |

Primary Examiner—Samuel Scott
Assistant Examiner—Randall L. Green
Attorney, Agent, or Firm—Pearson & Pearson

[57] ABSTRACT

A vertical, post and panel fence substantially surrounds a swimming pool, at about ground level, the posts extending downwardly into sockets and the fence barring entry to animals or children while warming pool water circulated therethrough to ambient temperature and heating it to higher temperature by solar energy.

The low cost panels are each formed of two edge-joined, corrugated sheets at right angles to each other. The vertical grooves form unobstructed, thin, vertical, water chambers fed at the bottom by the pool pump to flow upwardly at no more than 3 psi, and 60-70 gallons per hour for discharge from the top back to the pool.

Flexible shower pipes, and hydraulic head pressure relief pipes normally extend upwardly from the fence, the latter to prevent bulge of the low pressure panels. The length of exposed fence is proportionate to pool capacity.

2 Claims, 7 Drawing Figures

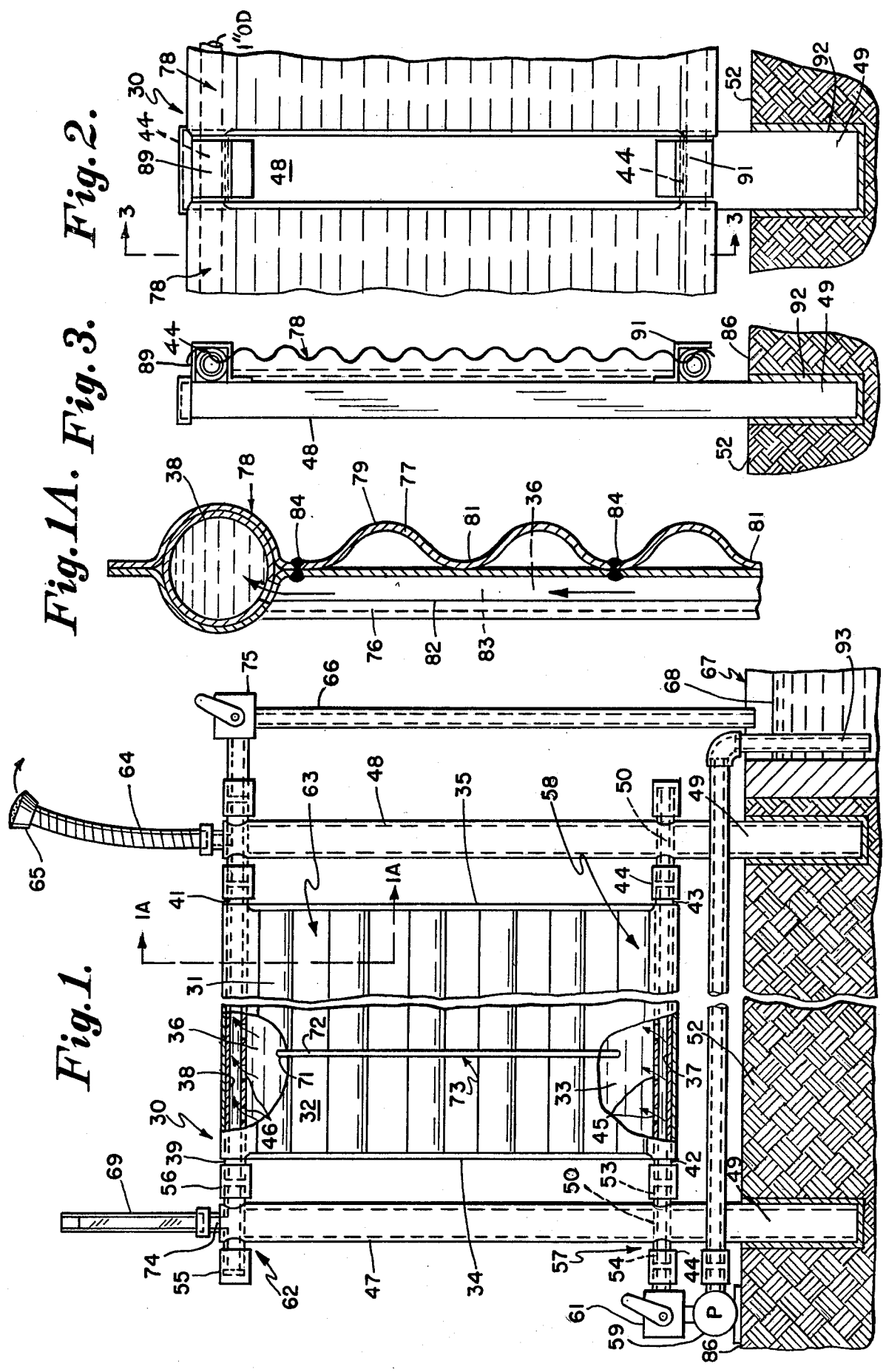

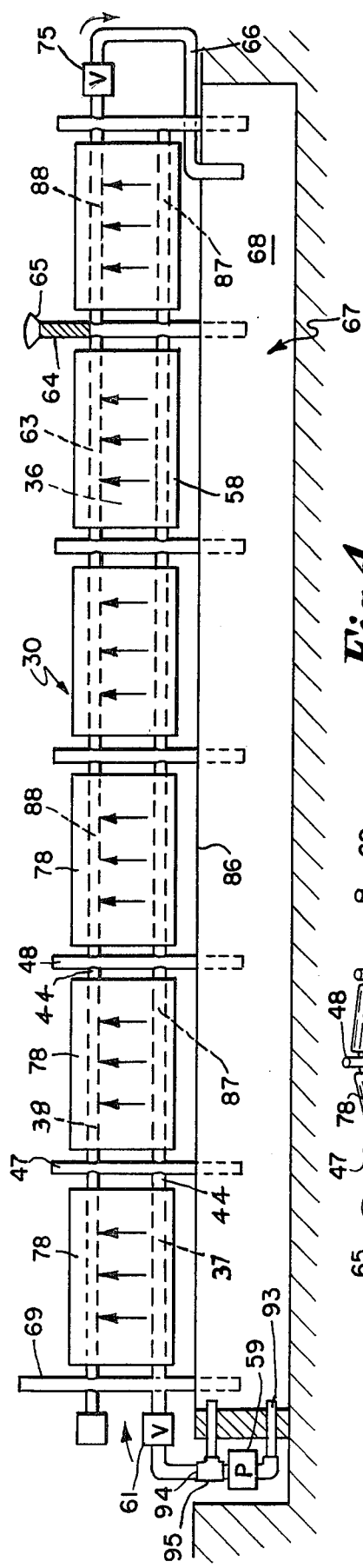
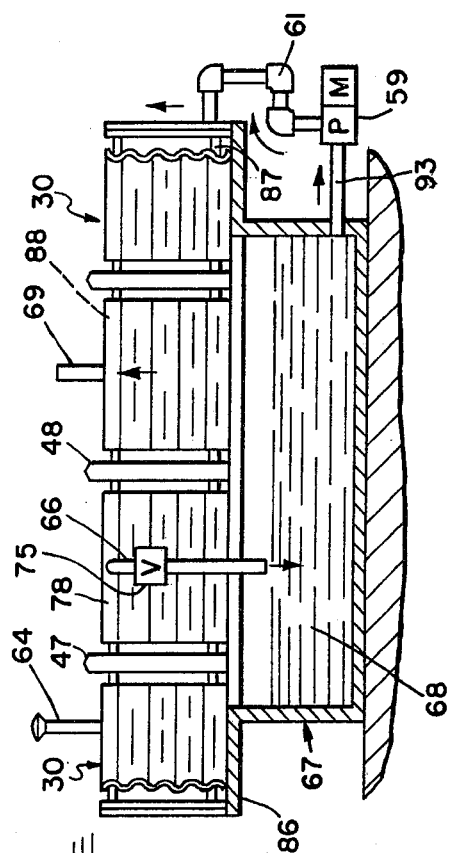
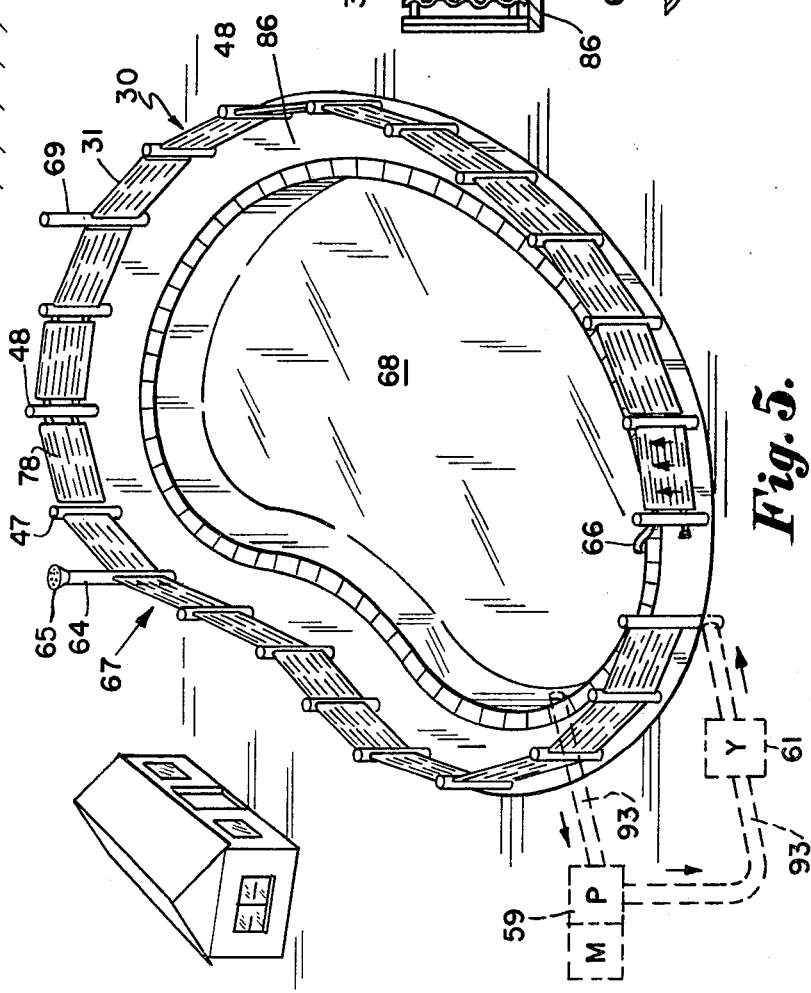
Fig. 4.
Fig. 6.
Fig. 5.

LOW COST, LOW PRESSURE, SOLAR HEATED FENCE SURROUNDING A SWIMMING POOL

RELATED APPLICATION

This application is a continuation-in-part of my application Ser. No. 116,295 filed Jan. 28, 1980, abandoned, which was a continuation of my application Ser. No. 894,401 filed Apr. 7, 1978 both now abandoned.

BACKGROUND OF THE INVENTION

It has heretofore been proposed to provide a solar heat exchanger panel angularly disposed to the ground with one side wall facing the sun, the upper end connected to a swimming pool pump and the lower end discharging heated water into the swimming pool as in U.S. Pat. Nos. 3,146,774 to Yellott of 1964, and 3,991,742 to Gerber of 1976.

The Gerber flexible sheet panels lie on the roof of a building and thus are not self supporting in upstanding position at ground, or pool water, level, capable of serving as a fence around the pool.

Similarly in U.S. Pat. No. 3,200,820 to Garrett of 1965, an umbrella type, hollow, dished panel is supported, by a central post, at an angle to the ground, the outer periphery being fed from a swimming pool pump and the central, lower portion discharging into a swimming pool. The incoming pressure in this device is stated to be eight to sixteen psi with a flow of approximately six gallons per minute and a water layer depth of about ⅛ inch.

The Gerber patent teaches a minimum flow rate of 300 gallons per hour, and gravity flow down the panels.

In U.S. Pat. No. 3,599,626 to Bouse of 1971, the pool water never is heated in a panel but is heated in a coil immersed in a solar heated tank.

SUMMARY OF THE INVENTION

In this invention the double walled fence panel may be formed of thin, sheet metal which is preferably black. The walls are uniformly spaced at about one half inch apart and relatively broad, for example, a rectangle about four feet high by eight feet long.

If thin, low cost, sheet metal is used, integral vertical braces may be provided at spaced distances across the length of the interior of the panel to prevent inward collapse or outward bulge and to make the fence panel self supporting. Such braces may be ribs, impressed in each sheet at opposite locations to meet and jointly form a reinforcing vertical partition which does not obstruct the upward flow through of liquid.

Preferably, however, the two sheets forming the double walled panel are of low cost, commercially available corrugated plastic sheets with the corrugations of one transverse, or normal, to the corrugations of the other, the contacting areas being spot adhered or fused for example in ten spots per square foot.

The low cost, corrugated fence panels of the invention are edge joined to each other and supported vertically between vertical fence posts each extending below the panels one or two feet into socket means below ground level.

The posts and panels substantially surround the swimming pool at ground level to bar entry of children or animals while heating the pool water at least to ambient temperature or higher under solar exposure. The liquid is supplied to the lower portion of the panel at no more than three pounds per square inch and preferably at about two pounds per square inch to flow upwardly therein for discharge from an upper portion of the panel at no more than about 60-70 gallons per hour and preferably at about one gallon per minute. The water warmed by slow flow upwardly in the panel may be discharged from the upper portion into a normally upstanding flexible tube and shower head bent downwardly or directly into a pool.

An hydraulic head pressure relief stand pipe, or riser, is provided in the higher portion of one panel of the panels of the fence to prevent bulge of the panel under inadvertent high pressure of incoming liquid. A flow restriction orifice valve is provided proximate the lower portion of the panel to reduce incoming pressure from tap water, or pump, pressure of about sixty psi to about 2 psi and to produce a flow of about one gallon per minute.

As shown the panels are rectangular and supported at a ninety degree angle to the ground by hollow tubular vertical fence posts, one post having a T coupling with a riser at the top, another post having a T coupling with a shower at the top and the reducing valve being at the bottom of one of the posts.

As far as I am aware, the prior art does not disclose a vertical swimming pool fence extending substantially, or entirely, around a swimming pool, at or near ground level and formed of vertical, low cost, corrugated, panels each supported between a pair of fence posts, the posts extending downwardly below the panels, into sockets in the dirt, wood or cement surrounding the rim of the pool. Neither has low cost been achieved by using a panel pressure of no more than 3 psi, an upward flow rate of 60-70 gallons per hour, and enough panels to surround the pool whatever its capacity, so that ambient temperature alone will warm the pool and solar energy will positively heat the pool despite the vertical orientation of the fence panels.

BRIEF DESCRIPTION OF THE DRAWINGS

FIG. 1 is a front elevational view, partly in section showing a swimming pool fence constructed in accordance with the invention;

FIG. 1A is an enlarged fragmentary view in section on line 1A of FIG. 1.

FIG. 2 is a fragmentary, front elevational view showing the preferred corrugated plastic panels supported on the vertical posts by brackets;

FIG. 3 is a side elevational view thereof on line 3—3 of FIG. 2;

FIG. 4 is a schematic view of the solar heated swimming pool fence of the invention;

FIG. 5 is a perspective view of an in ground installation and

FIG. 6 a side elevation in half section of an above ground type.

DESCRIPTION OF A PREFERRED EMBODIMENT

In FIG. 1, a solar heat fence 30 is illustrated in the form of a rectangular panel 31 which is relatively broad in area such as four feet high by eight feet long and which is formed of a pair of thin metal sheets 32 and 33 spaced about one half inch apart. The opposed metal side walls 32 and 33 are preferably of sheet aluminum each about 0.030 inches in thickness and the sun exposed wall is preferably black to absorb solar heat. The side walls 32 and 33 are peripherally bonded or joined by welded edge flanges such as at 34 and 35 to form the liquid chamber, or compartment 36 therewithin. Chamber 36 encloses a lower, horizontal pipe 37 and an upper, horizontal pipe 38, which lend strength to the panel and which protrude at each opposite end 39, 41, 42 and 43 for connection to hose clamp or threaded couplings 44. Inflow pipe 37 is apertured at 45 and outflow pipe 38 is apertured at 46, to permit upward flow through thin, wide chamber 36 for heating of the liquid therein by the sun, or by ambient temperature.

A plurality of fence posts such as 47 and 48 of suitable material are provided, sufficient to substantially, or entirely, surround a swimming pool with one vertical panel 31 supported between each two adjacent posts 47 and 48. As shown in FIGS. 4, 5, and 6 the fence posts are in the same plane as the panels. In FIG. 1 each fence post is hollow tubular with its lower end 49 projecting downwardly below the panels 31 and received in socket means such as a cylinderical hole in the ground, cement or wood lining the pool or in a cylinderical metal socket embedded in such a hole in the ground 52. Each post 47 or 48 may include a lower tube 50 having opposite ends 53 and 54 for connection to adjacent couplings 44 and a similar upper tube 50. As shown, however, an upper, T shaped, coupling 74 may be provided with such protruding ends 55 and 56, threadedly connected, or clamped, to the corresponding couplings 44 of adjacent panels 31 and having an upstanding stem for connection to the shower head or pressure relief pipe of the invention. Thus, an elongated fence may be assembled in a modular manner to provide sufficient sun exposed area to heat a typical pool.

The liquid inlet means 57 connects the lower portion 58 of the vertical, unobstructed, liquid chamber 36 of each panel to a source of liquid such as the swimming pool pump 59 and preferably includes the flow restricting orifice valve 61 mounted proximate the lower portions 58 of the panels to reduce liquid pressure from twenty to sixty pounds per square inch down to no more than three pounds per square inch and preferably about two pounds per square inch and to maintain upward flow in each chamber 36 of each panel 37 at about one gallon per minute or no more than 60–70 gallons per hour.

Liquid outlet means 62 connects the upper portions 63 of the liquid chamber 36 of at least one of the panels to a flexible tube, or hose, 64 and shower head 65, which tube is normally upstanding to prevent flow but which may be bent downwardly to emit warm shower water. Liquid outlet means 62 also connects the upper portions 63 of the liquid chamber of at least one of the fence panels to the conduit 66 and its fixed orifice valve 75, and thence directly into the pool 67 for warming the water 68 thereof.

At least one post 47 or 48 of the solar fence 30 includes an open riser, or stand pipe, 69 of transparent or translucent material at the top thereof to relieve undue pressure which might bulge the thin metal side walls of the panels 31 and which creates a hydraulic head for enabling the panel chambers 36 of an elongated fence 30 to be at slightly different ground levels while still being full of water.

Each panel 31 may include at least one vertical brace, or rib, extending at least part way from top to bottom of the interior of its chamber 36 from one side wall to the other to prevent inward collapse or outward bulge of the thin metal of the walls. As shown in FIG. 1 a rib, or bead, 71 or 72 is impressed integrally in each side wall to meet, or overlap, and form at least one interrupted, brace 73 within the chamber which will strengthen the panel without interfering with or obstructing upward flow.

Preferably, however, as shown in FIG. 1A, FIG. 2, and FIG. 3, each thin sheet 76 and 77 of each panel 78 is corrugated with spaced ribs 79 and grooves 81 in one sheet and spaced ribs 82, and grooves 83 in the other sheet, the ribs 82 bring transverse, or normal, to the ribs 79 and spot welded as at 84 adhered or fused to each other to form the solar panel 78.

The T-shaped couplings 74 permit interchange threading of a riser 69 or a shower tube 64 along the fence. The adjustable orifice valve 75, with the orifice size fixed, is preferably provided as part of the liquid outlet means 62. A single fence panel 31 or 78 with its posts 47 and 48 and its shower tube 64, and shower head 65 may form an outdoor shower connected to a tap water faucet if desired.

Simple tests with small flat wall panels about noon time at a typical summer day in New England with an air temperature of 80° F. and light wind show the following results when applied to a typical solar fence of 16 active fence panels 31 as delineated:

| | |
|---|---|
| Sun exposed panel face | 4,200 in$^2$ |
| Panel water capacity | 7 gal. |
| Number of active panels | 16 |
| Flow rate per panel | 70 gal/hr. |
| Temperature increase | 30° F. |
| Pool capacity | 25,000 gal. |

At above flow rate, the total flow rate for 16 panels is 1120 gal/hr. Assuming the air temperature is high enough to disregard heat losses, a simplified evaluation for the purpose of this discussion shows the following results:

$$25,000 \text{ gal.} \times 8.34 \frac{\text{lb.}}{\text{gal.}} \frac{\text{BTU}}{(1 1b° \text{ F.})} = 208,500 \frac{\text{BTU}}{°\text{F.}}.$$

Hence 208,500 BTU of heat input is required to raise the pool's water temperature by 1° F. Assuming the pool 67 has cooled off during the night to 68° F. and it is desired to raise the water temperature by 5° F. to a more comfortable 73° F. requires the input of 208,500 × 5 = 1,042,500 BTU.

At a flow rate of 70 gal/hr., the total solar fence system flow rate is 70 × 16 = 1120 gal/hr. Hence $$1120 \frac{\text{gal.}}{\text{hr.}} \times 8.34 \frac{\text{lb.}}{\text{gal.}} \frac{\text{BTU}}{(1 1b° \text{ F.})} \times 30° \text{ F.} = 280,224 \frac{\text{BTU}}{\text{hr.}}$$

The time of early mid-day sunshine required to raise the pool's water temperature by 5° F., circulating 1120 gal/hr through the solar fence, is $$\frac{1,042,500 \text{ BTU}}{280,224 \frac{\text{BTU}}{\text{hr}}} = 3\frac{3}{4} \text{ hours.}$$

In addition, the solar fence provides a pool shower at about 100° F. for the cost of a shower head with a flexible hose attachment.

The design flow rate of a maximum of 70 gallons per hour, which allows a temperature increase over the pool water of 30° F. continuously, equals the flow rate of the common indoor shower. Since normally a shower is used only for a few minutes duration, the pool water loss is negligible. For instance, an hour of full flow hot shower would lower the pool's surface by about one eighth of an inch, while about 6% of the heat input to the pool is lost during the shower.

With the continuing increase of energy costs, the electric heating of swimming pools becomes more and more prohibitive. The addition of a solar heating system, as presently available, would add considerable cost to any pool installation.

Outdoor pools are commonly used when the air temperature is pleasantly warm, independent of sun exposure, but the pool water may have cooled off during the night to an uncomfortable low water temperature. Raising the temperature by only a few degrees would satisfy general requirements.

Presently available solar pool heating systems are not only expensive ($3,000.00–5,000.00), but they are cumbersome to install and do not blend into the accustomed environment with their solar panel boxes on roofs or on ground stands with the associated piping, controls, and maintainance procedures.

The development of the pool heating system of this invention was guided by the following fundamental requirements:
Minimum cost over common pool installations.
Simplicity with a minimum of maintainance requirements.
Pleasing, inconspicuous appearance.
Accustomed environment compatibility.
Applicable to above ground and in ground pools of any size.
Utilization of direct sun energy as well as indirect through near object reflections.
Utilization of ambient warm air when air is reasonably above pool water temperature on overcast days.
Prevention of overheating at stagnation or water circulation failure.

The solar system of this invention can be applied to a variety of outdoor uses in addition to swimming pool heating, but the principal item is the swimming pool fence 30, which doubles as a solar pool heater with outdoor shower 64. The shower 64, which adds to the system only the cost of a shower head 65, is intended to be used by people before entering the pool water 68.

The simplicity of this low pressure solar fence 30 is highlighted by the systems schematic for pool heating, FIG. 4. The simplicity of the system adds very little cost over conventional fences. The examples of the application of the invention are based on this system schematic and on model test results which were obtained from tests conducted in New England during mid-summer of 1979 around noon with the example requirement to raise the pool water temperature by 5° F. from 68° F. to a comfortable 73° at an ambient temperature of about 85°.

In contrast to commonly known collectors on roofs or stands with collectors thermally insulated from the environmental air except for exposure to direct sun, and operating on relatively high water pressure, this invention utilizes all available heat inputs, i.e. from direct sun exposure, indirect reflection, plus ambient air, and it operates on extremely low water pressure. The absorbing panel surfaces are pressurized to only about 2 psi which enables the panels to be vertical without bulge.

Commensurate with this low pressure and the corrugated panel surface configuration, the best water volume and flow rater for the heat absorbing panels were established as fixed parameters, expressed per square foot of active panel face area. These findings were applied to the example configurations.

FIGS. 2–6 show a plurality of modular fence panels of the invention each consisting of a pair of opposed thin sheet walls peripherally joined to form a thin interior vertical chamber. Interfacing with the pool's water circulating system simply requires tapping of the water return line for feeding the fence at the lower pipe connection while the water return from the fence is connected to the upper part with gravity flow directly to the pool. The water flow system through the panel is best delineated in FIGS. 1 and 4. FIGS. 1, 4, 5, and 6 also show at least one translucent "Riser Pipe" 69 which is open at the upper end. The water inlet flow into the fence is set by a hand controlled simple control valve 61 (simple ball cock) to a visible level in the riser pipe 69, against a flow restriction valve (orifice 75) at the fence exit. A slight back pressure is so created while at the same time free air venting occurs. The water pressure inside all fence panels 31 and 78 is thus limited to the static water head pressure as given by the overall height of about 5 feet.

This back pressure of about 2 psi is essential for the assurance of practically equal water flow rates for all panels, although the panels may not be in an exactly horizontal plane. The free air and water venting of the system does not allow the build up of destructive pressures since at higher than design flow rares the water would simply overflow through the open riser pipe shown on FIGS. 1, 4, 5 and 6.

FIG. 4 shows a shower head 65 on top of a flexible riser pipe 64, located near the end of the solar fence 30. This showerhead riser pipe consists of flexible tubing which can be bent down to let water exit at a predetermined position. The position is selected to allow a flow of 70 gal/hr which equals the flow rate of a regular indoor shower.

The selected water flow rate in conjunction with the design given static pressure in the open system allows sizing of the required water exit flow restriction. This orifice in the form of a hole in a disk in valve 75 is located where the water return line 66 of liquid outlet means 62 connects.

The panel flow rate per hour is computed by multiplying the water capacity of the panel by a factor of 10, with 0.237 gals. per square foot of active face area. The tentatively selected panel design with its one inch manifold tubes limits a fence section or panel 31 to a total of about 40 square feet. Research results of common pool sizes may suggest the need for longer fence "runs" in which case larger panel manifolds may be selected.

Overheating of the panels 31 or 78 is impossible. At any condition, the outer surface temperature will be less than 130° F. which is the acceptable limit for surfaces exposed to human touch. At the selected flow rate, the temperature of the panels cannot reach the maximum allowable. At pump failure, the water in the panels will flow back to the pool. The empty panels 31 then can be compared to any other surface of dark, color, exposed to the sun.

The panels may be constructed as welded, pressure fused, or bonded metal designs, or as bonded plastics. FIG. 1 exemplifies an aluminum design which would be strong enough as a fence wall of up to 8 feet in length between posts. A flat black color is preferred for the panels, but certain dark green colors may be acceptable.

Different colors for the posts and interconnections may break the monotony.

By the use of corrugated panels preferably of low cost plastic, by peripherally edge joining a pair of such panels with an apertured lower influent pipe and an apertured upper effluent pipe enclosed in the resulting thin chamber and with the corrugations of one panel normal to the corrugations fused, a strong, low cost modular fence panel 31 is achieved which is within the financial reach of the average pool owner.

Such a novel fence 30 extending entirely, or substantially, around a swimming pool, can be vertical rather than inclined because it not only picks up solar heat all day long because of its corrugations, ribs and grooves, but also picks up heat reflected from the ripples of the water in the pool as well as heat from the ambient air caused by the heated cement coping, etc. around the pool, and especially since the thin walls of the panels bring the liquid to be heated close to the surface being heated for efficient heat transfer.

As shown, the combined vertical barrier swimming pool fence and swimming pool water heater 30 of the invention, forms an enclosure extending continuously in a substantially closed loop around the walkway 86 of an in ground, or above ground pool, each self-supporting, modular, fence panel, or section, 31 or 78, at walkway, water on ground level.

Each panel, or section 31 or 78 forms a thin, water-tight, water chamber 36, with unobstructed vertical, upward water flow when supported between one of the pairs of vertical fence posts. Lower couplings 44 connect the apertured inflow, or distributor, pipes 37 into a continuous, lower distributor pipe 87 extending full length of all of the chambers 36 of fence 30 and upper couplings 44 connect the upper apertured, outflow, or collector, pipes 38 into a continuous upper collector pipe 88 extending full length of all of the chambers 36 of fence 30.

As shown in FIGS. 2 and 3 the couplings 44 may be flexible hose connections secured to the posts by upper brackets 89 and lower brackets 91. The portions 49 of each post, extending below the sections 30 or 78 may be slidably received in cylinderical sockets 92.

The in flow or supply line 93 may be connected to a T joint 94 as shown in FIG. 4 with a suitable valve 95 to guide pool water back into the pool or up through the fence 30. The fence posts may be of any suitable material and may be secured to the walkway or ground in any manner enabling the sections 31 or 78 to remain vertical against strong wind while barring intruders or children, animals, etc.

I claim:

1. A combination fence and solar heater for swimming pools, of the type having a plurality of vertical fence posts and hollow fence panels forming a continuous fence around the periphery of the pool, said panels having interior chambers interconnected with each other and with the water in the pool to form a water carrying passageway from the pool, through said chambers, and back to the pool and having a water pump for circulating pool water around said passageway for warming by the heat of the sun, characterized by:

said fence panels and fence posts being in substantially the same vertical plane, with each panel supported in the space between a pair of adjacent posts;

each said fence panel comprising a pair of closely spaced, corrugated, plastic sheets, of relatively broad area, peripherally joined along the edges, with the ribs and grooves of one sheet normal to the ribs and grooves of the other sheet so that the interior chamber therein is thin, free of obstruction to vertical flow and of relatively wide area;

cross bracing means between said sheets for preventing bulge thereof under water pressure;

a flow control valve mounted between said pump and said fence panels for establishing pressure at no more than about 3 psi and rate at no more than about 60–70 gallons per hour per panel;

a back pressure valve mounted between said fence and said pool for assuring substantially even flow to all panels of said fence;

and an open air and water riser pipe connected to said water carrying passageway at the top of a panel to prevent build-up of destructive pressures tending to bulge said panels.

2. A combination as specified in claim 1 wherein:

each said panel is about four to five feet in height and about four to eight feet in length, the sheets of the panels are of a dark color and the posts are of a contrasting lighter color to break the monotony.

* * * * *